(12) United States Patent
Emrani

(10) Patent No.: US 10,211,576 B2
(45) Date of Patent: Feb. 19, 2019

(54) CONNECTOR WITH SELF-POWERED MATING DETECTION

(71) Applicant: Ford Global Technologies, LLC, Dearborn, MI (US)

(72) Inventor: Amin Emrani, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 15/040,742

(22) Filed: Feb. 10, 2016

(65) Prior Publication Data

US 2017/0229821 A1   Aug. 10, 2017

(51) Int. Cl.
*H01R 13/66* (2006.01)
*H01H 27/00* (2006.01)
*H01R 13/70* (2006.01)
*H04Q 1/02* (2006.01)

(52) U.S. Cl.
CPC ......... *H01R 13/6691* (2013.01); *H01H 27/00* (2013.01); *H01R 13/6683* (2013.01); *H01R 13/70* (2013.01); *H04Q 1/136* (2013.01); *H04Q 1/138* (2013.01)

(58) Field of Classification Search
CPC ...... H01L 41/107; H01L 41/044; G01P 15/09; H04R 17/00
USPC .................................. 310/318, 319, 323.21
See application file for complete search history.

(56) References Cited

U.S. PATENT DOCUMENTS

| | | | |
|---|---|---|---|
| 5,470,251 A * | 11/1995 | Sano | H01R 13/641 439/188 |
| 7,469,595 B2 | 12/2008 | Kessler et al. | |
| 8,400,319 B2 | 3/2013 | Montena | |
| 2007/0182535 A1 | 8/2007 | Seguchi | |
| 2010/0079238 A1* | 4/2010 | Gravelle | G06K 19/0707 340/5.8 |
| 2011/0053398 A1* | 3/2011 | Arai | H01B 7/285 439/271 |
| 2011/0156532 A1* | 6/2011 | Churchill | H01L 27/20 310/319 |

(Continued)

FOREIGN PATENT DOCUMENTS

| | | |
|---|---|---|
| JP | 2010092249 A | 4/2010 |
| WO | WO 2007016956 A1 | 2/2007 |

OTHER PUBLICATIONS

Search Report dated May 12, 2017 for GB Patent Application No. GB1702104.9 (3 pages).

*Primary Examiner* — Bryan P Gordon
(74) *Attorney, Agent, or Firm* — James P. Muraff; Neal, Gerber & Eisenberg LLP

(57) ABSTRACT

A connector with self-powered mating detection is disclosed. An example disclosed connector pair includes a first connector. The example connector pair also includes a piezoelectric sensor attached to the first connector. The example piezoelectric sensor generates a voltage when the first connector and a second connector are mated. The example piezoelectric sensor generates a voltage when the first connector and a second connector are unmated. The example connector pair also includes a memory circuit electrically coupled to the piezoelectric sensor to record a connection event in response to detecting voltage generated by the piezoelectric sensor(s). Additionally, the example connector pair includes an RFID circuit electrically coupled to the memory circuit. The example RFID circuit transmits the connection events.

17 Claims, 2 Drawing Sheets

(56) References Cited

U.S. PATENT DOCUMENTS

2012/0274452 A1* 11/2012 Chamarti ............. G02B 6/3895
                                                                  340/10.5
2013/0102184 A1    4/2013  Suzuki et al.
2014/0109672 A1    4/2014  Eble
2015/0017831 A1* 1/2015 Wang ................ H01R 13/6683
                                                                    439/488

* cited by examiner

CONNECTOR WITH SELF-POWERED MATING DETECTION

TECHNICAL FIELD

The present disclosure generally relates to connectors, and more specifically to connectors with self-powered mating detection.

BACKGROUND

Connectors act as electrical interfaces that join electrical circuits. For example, in a vehicle, the connectors connect individual components to a wire harness that forms a power and/or communication distribution system. When connectors are not mated properly when the vehicle is assembled, the connectors can come apart later due to vibrations of the vehicle while driving. This can cause reliability issues, which in turn causes the vehicles to be serviced. Additionally, an unmated connector can be used to gain unauthorized access to the communication bus of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example connector pair includes a first connector. The example connector pair also includes a piezoelectric sensor attached to the first connector. The piezoelectric sensor generates voltage when the first connector and a second connector are mated. The example connector pair also includes a memory circuit electrically coupled to the piezoelectric sensor to record a connection event in response to detecting voltage generated by the piezoelectric sensor. Additionally, the example connector pair includes an RFID circuit electrically coupled to the memory circuit. The RFID circuit transmits the connection events.

An example circuit includes a piezoelectric sensor. The example circuit also includes a microprocessor electrically coupled to the piezoelectric sensor. The microprocessor records a connection event in a non-volatile memory in response to the piezoelectric sensor generating an electric charge. The example circuit also includes an RFID antenna electrically coupled to the microprocessor The microprocessor transmits the connection events via the RFID antenna in response to receiving a signal from an RFID reader.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
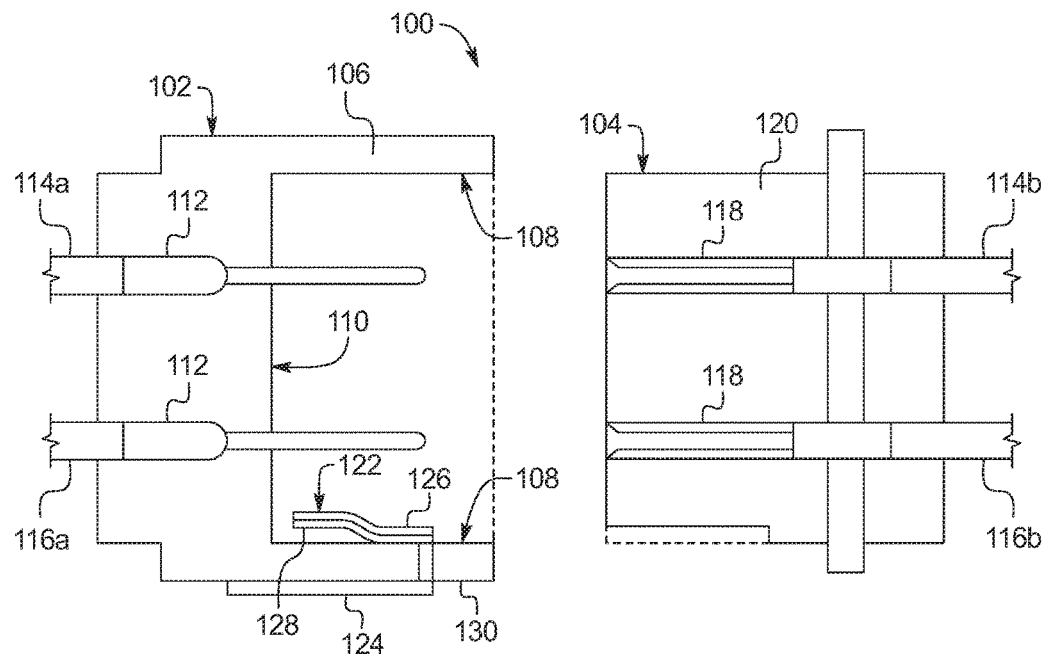
FIGS. 1A and 1B illustrate side cutout views of a self-powered mating detection connector in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Figure 1B:
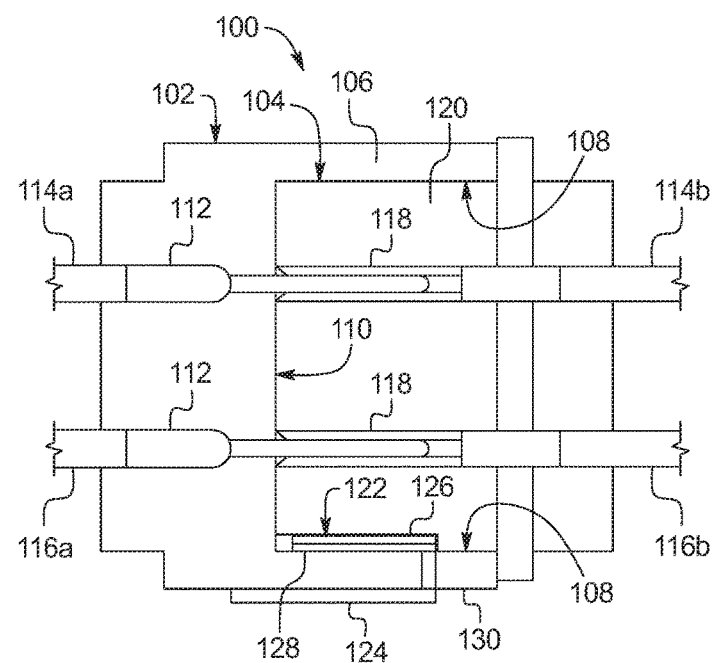

FIGS. 1A and 1B illustrate side cutout views of a self-powered mating detection connector pair 100 in accordance with the teachings of this disclosure. The self-powered mating detection connector pair 100 is also referred to herein as a connector pair for brevity. The connector pair 100 includes a first connector 102 and a second connector 104. FIG. 1A depicts the first connector 102 and the second connector 104 in an unmated state. FIG. 1B depicts the first connector 102 and the second connector 104 in a mated state. As used herein, the term "fully mated" is defined as the first connector 102 and the second connector 104 electrically and mechanically coupled such that they will not become uncoupled without the application of intentional force. In some examples, the first connector 102 is used as a terminal end of a wire harness and the second connector 104 is electrically coupled to a component (such as a sensor or an electronic control unit in a vehicle).

The first connector 102 has a body 106. The body 106 has interior walls 108 and an interior base 110. In the illustrated example, the first connector 102 is a male connector with pins 112. The pins 112 are attachable to electrical conductors 114a and 116a. For example, when assembled, the pins 112 may be crimped or soldered onto the electrical conductors 114a and 116a. The pins 112 are electrically isolated within the body 106 of the first connector 102. The first connector 102 may have any number of pins (such as, one, ten, twenty, etc.) and may be arranged in the body 106 in any suitable manner (such as, rectangular, circular, etc.) The body 106 of the first connector 102 may have different features (such as mounting brackets, strain relief brackets, etc.) depending on the use of the connector pair 100.

The second connector 104 is a female connector with sockets 118. The sockets 118 are attachable to electrical conductors 114b and 116b. For example, when assembled, the sockets 118 may be crimped or soldered onto the electrical conductors 114b and 116b. The sockets are electrically isolated within a body 120 of the second connector 104. The arrangement of the sockets 118 of the second connector 104 is complimentary to the arrangement of the pins 112 of the first connector 102. The body 120 of the second connector 104 may have different features (such as mounting brackets, strain relief brackets, etc.) depending on the use of the connector pair 100.

The electrical conductors 114a, 114b, 116a, and 116b may be wires and/or copper traces, etc. When the first and second connectors 102 and 104 are mated, the pins 112 of the first connector 102 and the sockets 118 of the second connector 104 are mechanically engaged so that the electrical conductors 114a and 116a attached to the first connector 102 are electrically coupled to the corresponding electrical conductors 114b and 116b attached to the second connector 104. The first and second connectors 102 and 104 lock together. For example, the first and second connectors 102 and 104 may include locking clips, coupling nuts, threads, jam nut sockets, and/or bayonet mounts, etc.

In the illustrated example, first connector 102 includes a piezoelectric sensor 122 and a connection detection circuit 124. The piezoelectric sensor 122 includes one or more cantilever beams with a piezoelectric layer 126 and a substrate layer 128. The piezoelectric layer 126 is a piezoelectric material, such as quartz or tourmaline, which generates electric charge in response to mechanic stress. For example, the piezoelectric layer 126 generates electric charge when the cantilever beam is deformed (as best shown in FIG. 1B). The substrate layer 128 is a stiff, but deformable, material that supports the piezoelectric layer 126.

In the illustrated example, the piezoelectric sensor 122 is attached to one of the interior walls 108 of the first connector 102. Alternatively, in some examples, the piezoelectric sensor 122 is attached the interior base 110 of the first connector 102. When inserted into the first connector 102 to engage the mechanical connection between the pins 112 and the sockets 118, the second connector 104 applies stress on the piezoelectric sensor 122 and deflects the cantilever beam. The piezoelectric sensor 122 is positioned within the first connector 102 such that the second connector the second connector 104 applies stress on the piezoelectric sensor 122 when the second connector 104 is mated to the first connector 102. In some examples, the first connector 102 may include a second piezoelectric sensor (not shown) detects when the second connector 104 is removed. For example, the second piezoelectric sensor may be positions such that the second piezoelectric sensor remains deflected longer than the piezoelectric sensor 122 when the first and second connectors 102 and 104 are unmated. In such examples, the connection detection circuit 124 detects the second piezoelectric sensor generating charge when the piezoelectric sensor 122 is not, and records a disconnection event in non-volatile memory.

As discussed in more detail below, the connection detection circuit 124 is powered by the electric charge generated when the piezoelectric sensor 122 is deformed. The connection detection circuit 124 is electrically coupled to the piezoelectric sensor 122. In the illustrated example, the connection detection circuit 124 is attached to an exterior wall 130 of the body 106 of the first connector 102. The connection detection circuit 124 is electrically coupled to the piezoelectric sensor 122 by a through hole (sometimes referred to as a "via"). Alternatively, in some examples, the connection detection circuit 124 is attached to the same interior wall 108 as the piezoelectric sensor 122, so that when the second connector 104 is mated to the first connector 102, the connection detection circuit 124 fits within a gap defined by the interior wall 108 of the first connector 102 and the second connector 104. In such examples, the connection detection circuit 124 may be electrically coupled to the piezoelectric sensor 122 by a copper trace.

When electric charge is generated by the piezoelectric sensor 122, the connection detection circuit 124 receives power and records a connection event in non-volatile memory. Additionally, while powered, the connection detection circuit 124 indicates that the connector pair 100 is currently mated. As discussed in more detail below, when interrogated by a radio-frequency identification (RFID) reader, the connection detection circuit 124 transmits one or more identifiers, the connection events stored in the non-volatile memory, and the indication of whether the connector pair 100 is currently mated.

Figure 2:
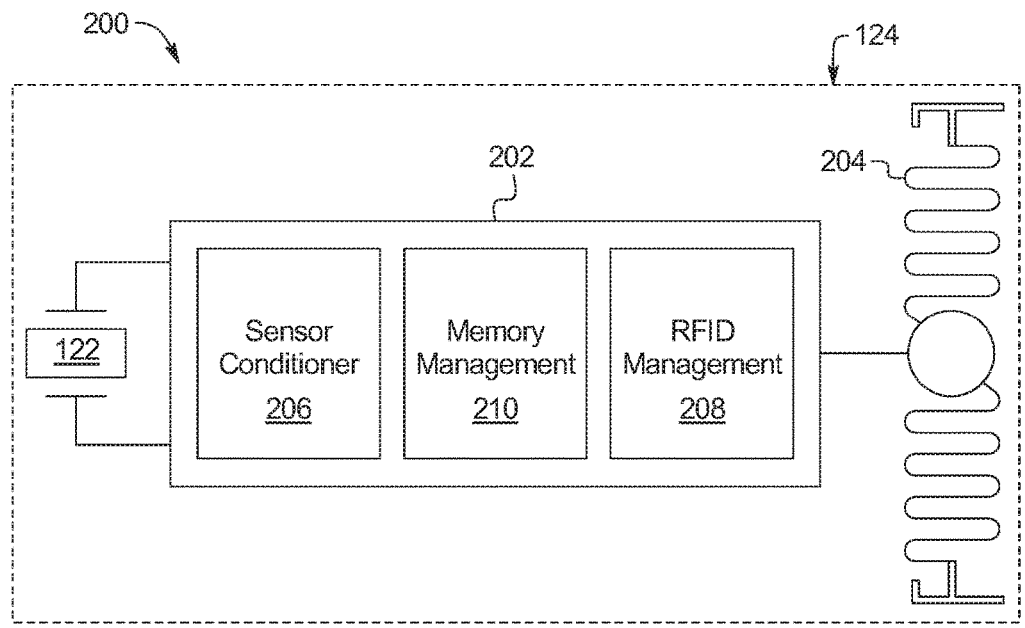
FIG. 2 illustrates a block diagram of the self-powered mating detection circuit of FIGS. 1A and 1B.

FIG. 2 illustrates a block diagram of a self-powered mating detection circuit 200. The self-powered mating detection circuit 200 includes the piezoelectric sensor 122, and the connection detection circuit 124 of FIGS. 1A and 1B. The connection detection circuit 124 includes a memory circuit 202, and an RFID antenna 204. When the piezoelectric sensor 122 is deformed, piezoelectric sensor 122 supplies electric charge to the memory circuit 202. The memory circuit 202 records connection events in non-volatile memory and transmits the connection events via the RFID antenna 204. Additionally, while being interrogated by the RFID reader, the RFID antenna 204 supplies electric charge to the memory circuit 202.

The memory circuit 202 may be implemented by one or more discrete components, integrated circuits, low-power microprocessor(s), application specific integrated circuit(s) (ASIC(s)), programmable logic device(s) (PLD(s)) and/or field programmable logic device(s) (FPLD(s)), etc. The memory circuit 202 includes a sensor conditioning circuit 206, an RFID management circuit 208, and a memory management circuit 210. The sensor conditioning circuit 206 converts the electric charge produced by the piezoelectric sensor 122 into a voltage used by the memory management circuit 210. The sensor conditioning circuit 206 may include capacitor(s) and/or a low-power power supply. The RFID management circuit 208 converts the electric charge produced by the RFID antenna 204 into a voltage used by the memory management circuit 210.

The memory management circuit 210 includes non-volatile memory (such as, flash memory, erasable programmable read-only memory (EPROM), resistive random-access memory (RRAM), etc.), a circuit to drive the non-volatile memory, and a transmit circuit to transmit the contents of the non-volatile memory in response to receiving a signal from the RFID reader. In some examples, the non-volatile memory and/or the transmit circuit may be integrated into a low-power microprocessor. Additionally, the memory management circuit 210 distinguishes between receiving voltage from the sensor conditioning circuit 206 and from the RFID management circuit 208.

When the memory management circuit 210 receives voltage from the sensor conditioning circuit 206, the memory management circuit 210 records the connection event into the non-volatile memory. In some examples, recording the connection event into the non-volatile memory may include incrementing a counter stored in the non-volatile memory. In one embodiment, the memory management circuit may also record the time mating (or unmating) happens. The memory management circuit 210 also maintains a connection indicator (e.g., a flag in memory). The connection indicator has (a) a first state (such as a logical true state) that signifies that the memory management circuit 210 is currently receiving voltage from the sensor conditioning circuit 206, and (b) a second state (such as a logical false state) that signifies that the memory management circuit 210 is not currently receiving voltage from the sensor conditioning circuit 206.

When the memory management circuit 210 receives voltage from the RFID management circuit 208, the memory management circuit 210 transmits, via the RFID antenna 204, the contents of the non-volatile memory, such as the record(s) of the connection events. In some examples, the non-volatile memory includes an identifier. The identifier is a value that identifies (a) the particular memory management circuit 210, (b) a wire harness associated with the connector pair 100, and/or a vehicle associated with the connector pair 100. The memory management circuit 210 also transmits the state of the connection indicator.

Figure 3:
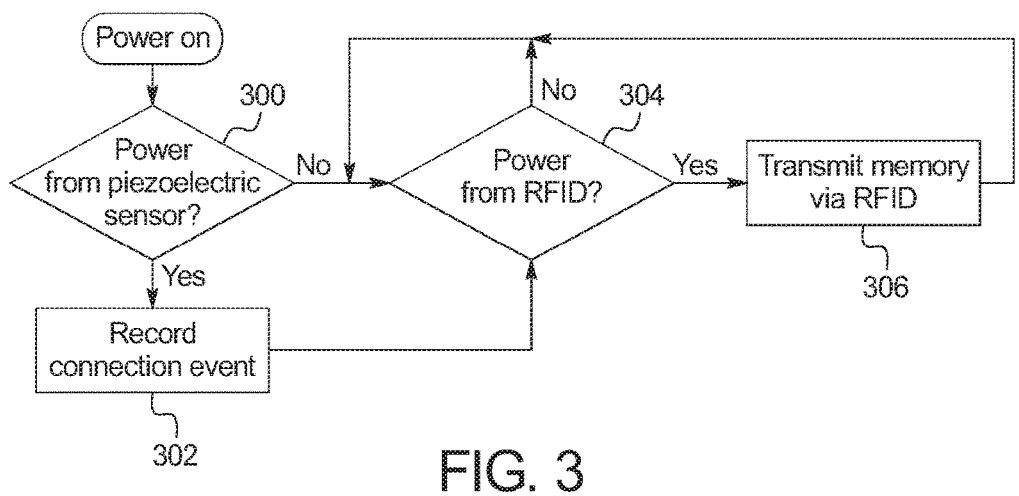
FIG. 3 is a flow chart of an example method that may be executed to implement the self-powered mating detection circuit of FIGS. 1A, 1B, and 2.

FIG. 3 is a flow chart of an example method of detecting when two connectors 102 and 104 of the connector pair 100 are mated. Initially, after powering on, the memory management circuit 210 determines whether it is receiving power from the piezoelectric sensor 122 (block 300). For example, if the piezoelectric sensor 122 is generating electric charge, the sensor conditioning circuit 206 supplies power to the memory management circuit 210. If the memory management circuit 210 is receiving power from the piezoelectric sensor 122, the memory management circuit 210 records the connection event in its non-volatile memory (block 302). For example, the memory management circuit 210 may increment a counter stored in the non-volatile memory.

The memory management circuit 210 determines whether it is receiving power from the RFID antenna 204 (block 304). For example, when a vehicle with the connector pair 100 is serviced, the vehicle may be scanned by an RFID reader. The scan induces electric charge in the RFID antenna 204. As a result, the RFID management circuit 208 supplies power to the memory management circuit 210. If the memory management circuit 210 is receiving power from the RFID antenna 204, the memory management circuit 210 transmits the contents of the non-volatile memory via the RFID antenna 204 (block 306). For example, the memory management circuit 210 may transmit an identifier associated with the connector, the number of connection events stored in the non-volatile memory, and the indication of whether the connector pair 100 is currently mated. The memory management circuit 210 then waits to receive power from the RFID antenna 204.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:
1. A connector pair comprising:
a first connector; and
a second connector comprising:
a piezoelectric sensor attached to the first connector, the piezoelectric sensor to:
generate a voltage when the first connector and the second connector are mated; and
be deformed when the first connector and the second connector are fully mated;
a memory circuit to record a connection event in response to detecting the voltage; and
an RFID circuit to transmit the connection event.

2. The connector pair of claim 1, wherein the piezoelectric sensor generates the voltage when the first connector and the second connector are fully mated.

3. The connector pair of claim 1, wherein the piezoelectric sensor is attached to an interior wall of the first connector.

4. The connector pair of claim 1, wherein the piezoelectric sensor includes a cantilever beam that is deformed when the first connector and the second connector are mated.

5. The connector pair of claim 1, wherein the memory circuit includes non-volatile memory.

6. The connector pair of claim 1, wherein the memory circuit includes a microprocessor with integrated non-volatile memory.

7. The connector pair of claim 1, wherein the RFID circuit includes an RFID antenna.

8. The connector pair of claim 1, wherein the RFID circuit supplies power to the memory circuit when the RFID circuit detects a signal from an RFID reader.

9. A first connector comprising:
a piezoelectric sensor, the piezoelectric sensor configured to:
generate an electric charge when the first connector is mated with a second connector; and
be deformed when the first connector is fully mated with the second connector;
a microprocessor electrically coupled to the piezoelectric sensor, the microprocessor configured to record a connection event in non-volatile memory in response to the piezoelectric sensor generating the electric charge; and
an RFID antenna electrically coupled to the microprocessor, the microprocessor configured to transmit the connection events via the RFID antenna in response to receiving a signal from an RFID reader.

10. The first connector of claim 9, wherein the piezoelectric sensor is attached to an interior surface of the first connector.

11. The first connector of claim 9, wherein the piezoelectric sensor includes a cantilever beam having a piezoelectric layer and a support layer.

12. The first connector of claim 11, wherein the piezoelectric sensor generates the electric charge in response to the second connector deforming the cantilever beam when the first connector and the second connector are mated.

13. The first connector of claim 12, wherein the first connector is electrically coupled to a wire harness, and the second connector is electrical coupled to a sensor in a vehicle.

14. The first connector of claim 9, including a sensor conditioning circuit to convert the electric charge generated by the piezoelectric sensor to be used by the microprocessor.

15. The first connector of claim 9, wherein the microprocessor transmits an identifier that identifies the first connecter and a count of connection events.

16. The connector pair of claim 1, wherein the piezoelectric sensor further comprises a first portion and a second portion,
wherein the second connector further comprises a body,
wherein the first portion is connected to the body,
wherein the second portion directly contacts the body when the first connector and the second connector are fully mated.

17. The connector pair of claim 1, wherein the first connector comprises sockets and the second connector further comprises pins, wherein the pins are inserted into the sockets when the first connector and the second connector are mated.

* * * * *